(12) United States Patent
Chimenti et al.

(10) Patent No.: US 7,240,815 B2
(45) Date of Patent: Jul. 10, 2007

(54) VERTICALLY ENGAGEABLE CARRIER FOOT

(75) Inventors: Thomas A. Chimenti, Fairfield, CT (US); Fred Clark, Woodbury, CT (US); Andreas Arvidsson, Hillerstorp (SE)

(73) Assignee: Thule Sweden AB, Hillerstrop (SE)

( * ) Notice: Subject to any disclaimer, the term of this patent is extended or adjusted under 35 U.S.C. 154(b) by 0 days.

(21) Appl. No.: 10/708,813

(22) Filed: Mar. 26, 2004

(65) Prior Publication Data

US 2005/0029320 A1 Feb. 10, 2005

Related U.S. Application Data

(63) Continuation of application No. 09/805,370, filed on Mar. 13, 2001, now Pat. No. 6,739,487, which is a continuation-in-part of application No. 09/259,442, filed on Mar. 1, 1999, now Pat. No. 6,305,589.

(60) Provisional application No. 60/189,070, filed on Mar. 13, 2000.

(51) Int. Cl.
*B60R 9/00* (2006.01)

(52) U.S. Cl. .................. 224/321; 224/309; 224/315; 224/325

(58) Field of Classification Search .............. 224/319, 224/320, 321, 322, 309, 314, 315, 325, 326, 224/327, 329, 330, 331, 558, 570, 555, 545, 224/42.28
See application file for complete search history.

(56) References Cited

U.S. PATENT DOCUMENTS 5,038,988 A 8/1991 Thulin

| | | | |
|---|---|---|---|
| 5,377,890 A | * | 1/1995 | Brunner et al. ............. 224/321 |
| 6,010,048 A | * | 1/2000 | Settelmayer ................. 224/321 |
| 6,050,044 A | * | 4/2000 | McIntosh .................... 52/591.1 |

\* cited by examiner

*Primary Examiner*—Nathan J. Newhouse
*Assistant Examiner*—Lester L. Vanterpool
(74) *Attorney, Agent, or Firm*—Novak Druce + Quigg, LLP

(57) ABSTRACT

An arrangement for securing a load carrier to a transporting vehicle that includes an anchor mechanism adapted for securement to a transporting vehicle and for releasable engagement with a carrier foot. The carrier foot has a latching mechanism for releasable engagement with the anchor mechanism. The latching mechanism is adapted for latching engagement to, and disengagement from the anchor mechanism by movement of the carrier foot in a direction substantially perpendicular to a longitudinal axis of the carrier foot. An example of such movement is vertical movement substantially of an up and down nature. The latching mechanism has a latching and an unlatching configuration and the latching mechanism is urged toward the latching configuration by a resilient biasing mechanism. The latching mechanism is adapted to move from the latching configuration to the unlatching configuration and back to the latching configuration under the influence of the resilient biasing mechanism and responsive to the carrier foot being positioned into latching engagement upon the anchor mechanism. An example of the resilient biasing mechanism is a spring that yields from a latching configuration to an unlatching configuration of that spring as the latching mechanism moves from its latching configuration to its unlatching configuration.

29 Claims, 12 Drawing Sheets

VERTICALLY ENGAGEABLE CARRIER FOOT

CROSS REFERENCE TO RELATED APPLICATIONS

The present application is a continuation application of U.S. patent application Ser. No. 09/805,370 filed Mar. 13, 2001 and issued on May 25, 2004 as U.S. Pat. No. 6,739,487 which is a continuation-in-part of U.S. patent application Ser. No. 09/259,442 filed Mar. 1, 1999 and issued on 23 Oct. 2001 as U.S. Pat. No. 6,305,589. U.S. patent application Ser. No. 09/805,370 claims the benefit of U.S. Provisional Application No. 60/189,070 filed Mar. 13, 2000. The disclosure of each prior application is expressly incorporated by reference herein, in their entireties.

BACKGROUND OF INVENTION

1. Technical Field

The present invention relates generally to vehicular load carriers, and more specifically to load carrier feet and anchors used in the attachment and support of load carriers upon a transporting vehicle.

2. Background Art

It is appreciated that a considerable amount of the time that is required to install a load carrier upon a vehicle is that time which is spent on the assembly of the carrier itself before its being attached to the transporting vehicle. As a result, it has been found to be an advantageous feature of carrier designs to enable installation and removal of a partially or fully assembled load carrier on to and off a transporting vehicle.

Known designs for carrier feet that can be installed upon and disconnected from the transporting vehicle while the carrier remains assembled are typically engaged upon a base fixed to the vehicle using a sliding motion parallel to the longitudinal axis of both the carrier foot and the transporting vehicle. This becomes problematic when the entire carrier is to remain assembled during removal because each foot typically must be simultaneously removed by being slid it off or out of its respective base together with the other feet. Similar difficulty is encountered when trying to install an assembled carrier onto a transporting vehicle's rooftop or other receiving surface. Each foot must be slidingly engaged upon its respective base, and because that base may not be a perfect fit with the foot, or the base may have become fouled while the foot was disengaged, sliding of the foot onto the base may be resisted. This experience has been likened to trying to slide a sticky drawer into a bureau. Previously, when the feet would each be individually installed upon the respective bases before the load carrier was assembled thereto, an operator could move about the transporting vehicle and manipulate each foot individually. Normally this includes wiggling the carrier foot onto the base in order to slide the carrier foot progressively into a properly seated position upon the base. Having configured each foot, the carrier could then be assembled thereupon. A compounding problem of such a process, however, is that the carrier feet are usually upon the roof of a transporting vehicle at this stage in the process and resultantly assemblage of the load carrier must be awkwardly carried out atop the vehicle. Necessarily, the operator will be reaching atop the transporting vehicle to complete the installation of the load carrier and be required to frequently move about the vehicle because that person's reach will be limited by the rooftop location.

Similar problems can be encountered when only a cross bar or strut is connected between two opposite feet and which must be installed to extend from one side to the other of the transporting vehicle. It will be difficult, if not impossible for a single person working alone to slide each foot onto its respective base because he or she will not be able to simultaneously align both feet with the two respective bases as is required for proper sliding engagement.

Conventional designs for such support feet have required in the past that an exterior cover be opened in order to expose for manipulation the operating device that affects the fastening of the carrier foot to its base. Therefore, when installing the foot upon the base, the exterior cover would normally be open so that the operating device can be manipulated into an open configuration for engagement upon a base or directly to a vehicle. Once engaged, however, the operating device must then again be manipulated to a closed or clamping configuration for fixing the foot to the base or vehicle. The exterior cover of the carrier foot is then closed and locked to prevent unauthorized tampering with the operating device. From the experience of working with these conventionally designed carrier feet, it has been recognized as desirable to minimize not only the exposure of the internal working parts of the foot, but to also minimize required operator interaction during the installation process when both hands can be better used for properly positioning at least the several feet, and possibly an entirely assembled carrier with respect to the various connection points for attachment thereto.

Another drawback of conventionally designed carrier feet is that they do not typically include an accommodation for adapting to differently configured vehicle mounting surfaces. This is particularly true in cases where the feet are attached to bases at the vehicle's roof at edge regions where contoured slopes are generally incorporated into the vehicle's design. Normally, the base for the foot is rigidly attached to the vehicle's roof in this sloped region and it is the carrier foot that is specially designed to be fixedly attached to that particular type of vehicle/base combination to compensate for the roofs configuration. As a result, the manufacturer of the feet must essentially provide custom designs for differently configured vehicles. It has been recognized as highly desirable by such manufacturers to enable a generic carrier foot design to be utilized on a wide range of differently configured transporting vehicles. Because the primary characteristic affecting this aspect of the design is the degree of slope at the roof region where the base is attached, it has been recognized for the present invention that facilitating pivotation of the carrier foot with respect to the base in the direction substantially parallel to the cross bar with which attachment must be made permits utilization of a uniformly designed carrier foot on multiple and differently configured transporting vehicles and bases.

In view of the above-described deficiencies associated with known designs for load carrier feet, the present invention has been developed to alleviate these drawbacks and provide benefits to the user, which have been appreciated as desirable at least partially through historical use of these known designs. These enhancements and benefits are described in detail herein below with respect to several alternative embodiments of the present invention.

SUMMARY OF INVENTION

The present invention in its several disclosed embodiments alleviates the drawbacks described above with respect to conventionally designed load carrier feet and incorporates several additionally beneficial features.

A primary benefit of the carrier foot design of the present invention is that it permits a carrier foot to be engaged upon a supporting base in a substantially vertical direction and without operator manipulation of latching mechanisms in the carrier foot. Installation is accomplished merely by positioning the carrier foot properly upon the base. This eliminates the sliding engagement described above which has been appreciated as a detrimental characteristic of conventionally designed carrier feet. Also, because the latching member of the present invention's operating mechanism is yieldably biased toward a latching and also locked configuration, the foot can be arranged into the latching and locked configuration before being positioned upon the base and then merely pressed into engagement with the base without further manipulation being required prior to utilization of the carrier foot. A side benefit of this configuration is that it provides a failsafe design because of the bias toward the locked configuration. That is, the carrier foot is urged away from an unlatching or releasable configuration unless specifically reconfigured thereto by the operator. Still further, an advantageous characteristic of this design is that the carrier foot is made install able and disengageable without the use of tools.

An additional benefit of the present invention is that the operative members of the carrier foot are protectively and permanently housed within the shielding cover of the foot during normal utilization. There is no need to open the foot's housing since the only part of the operating mechanism requiring user manipulation is a push-button release mechanism. But even when the push button release mechanism is depressed for disengaging the foot from the base, the inner working mechanisms of the foot remain protected within the housing for the device. A locking mechanism is provided that is capable of preventing depression of the push button release mechanism and in turn unauthorized disengagement of the rack from the base. As in traditional designs, the lock is manipulated between locked and unlocked configurations using a conventionally cut key.

As discussed, in order to adapt a universally designed foot to different roof configurations and therefore different transporting vehicles without varying the carrier foot's construction, the latching mechanism in the foot includes a latch body that inserts into a space provided under a cylindrical catch bar thereby fastening the foot to the base. The latch body, however, is not fixed to the catch bar of the base, but instead is permitted to slide there-around. In this manner, pivotation of the foot about a longitudinal axis of the catch bar, which is parallel to a longitudinal axis of the foot, is facilitated thereby making it possible to adapt the same foot to differently configured vehicle roof designs. That is, the foot can be variably configured with respect to the base depending upon the pitch of the particular vehicle's roof at the point at which the base is connected. The top or head portion of the carrier foot in which a cross bar or load strut is engageable is manufactured to be exchangeable on the intermediate body portion of the foot. In the illustrated embodiment, the head portion is permanently fastened to the intermediate body portion before distribution to an end user. In this manner, the configuration of the foot is easily adapted by the manufacturer depending upon the anticipated shape and design of the cross bar expected to be utilized with the particular foot. In the preferred embodiment, a securing mechanism used for releasably securing the cross bar to the head portion of the carrier foot incorporates members having opposed ramped surfaces that when slid relative to one another cause expansion and/or contraction of the securing mechanism into and/or out of securing engagement with the cross bar. An analogous securing device has been more fully described in commonly owned U.S. Pat. No. 5,038,988, the disclosure of which is expressly incorporated herein by reference.

The separate construction of the base member from the carrier foot body makes it possible for that base member to be custom designed for installation upon a particularly configured vehicle. The connection between the base and the carrier foot, however, is made generic so that the foot body need not be individually adapted for different vehicles. This makes providing an array of product for different vehicles much less expensive than in cases in which each foot must to be custom-adapted for a particular vehicle.

As shown, the base can be left on the transporting vehicle with the catch bar exposed when a footed load carrier is not being used. The catch bar can be utilized as a tie-down loop in this configuration for securing other types of loads to the vehicle.

In at least one embodiment, the present invention takes the form of an arrangement for securing a load carrier to a transporting vehicle. The arrangement includes an anchor mechanism that is adapted for securement to a transporting vehicle and for releasable engagement with a carrier foot. The carrier foot of the invention has a latching mechanism for releasable engagement with the anchor mechanism. The latching mechanism is adapted for latching engagement to and disengagement from the anchor mechanism by movement of the carrier foot in a direction substantially perpendicular to a longitudinal axis of the carrier foot. An example of such movement is vertical movement substantially of an up and down nature. The latching mechanism has a latching and an unlatching configuration and the latching mechanism is urged toward the latching configuration by a resilient biasing mechanism. Further, the latching mechanism is adapted to move from the latching configuration to the unlatching configuration and back to the latching configuration under the influence of the resilient biasing mechanism and responsive to the carrier foot being positioned into latching engagement upon the anchor mechanism. An example of the resilient biasing mechanism is a spring that yields from a latching configuration to an unlatching configuration of that spring as the latching mechanism moves from its latching configuration to its unlatching configuration.

In the illustrated embodiment, the latching mechanism has an operating mechanism for configuring the latching mechanism between the latching and the unlatching configurations. As shown, the operating mechanism includes a push-button actuator for operating the latching mechanism between the latching and the unlatching configurations. The push-button actuator is operatively associated with and controlled by a lock mechanism that is configured for alternatively allowing and preventing operation of the operating mechanism. Furthermore, the push-button actuator also cooperates with a resilient biasing mechanism for urging the push-button actuator toward a latching configuration.

The arrangement includes a housing configured to encase the operating mechanism and the latching mechanism thereby preventing access to such working mechanisms of the carrier foot. In a preferred embodiment, the push-button actuator is exposed through the housing for operator manipulation. That is, the only portion of the carrier foot that the operator must engage is the push-button actuator, and that is only when disengagement is required. Installation is accomplished without the operator having to manipulate the carrier foot at all, other than to move it into the latched configuration. Optionally, a lock mechanism may also be carried in the push-button actuator for preventing unauthorized actuation.

The anchor mechanism has a catch member and the latching mechanism has a latch body. The latch body is configured for latching cooperation with the catch member. In the illustrated embodiment, the catch member is a bar suspended between a pair of supports. The bar defines a catch area underneath itself for accepting at least a portion of the latch body therein.

The anchor mechanism is adapted to be fixed upon a vehicle with the catch member disposed at a distance from the vehicle. Usually, and as illustrated, this location is proximate the roof edges of the vehicle. The latch body has an abutment surface designed for engagement with the catch member in a latched configuration. As shown, the latch body has an inclined surface that is arranged for sliding engagement against the catch member as the carrier foot is installed upon the anchor mechanism. This sliding engagement causes the latching mechanism to move from the latching configuration into the unlatching configuration thereby permitting installation of the carrier foot into latched engagement upon the anchor mechanism.

Still further, the latching mechanism can be adapted to permit pivotation of the carrier foot about an axis that is substantially parallel to the longitudinal axis of the carrier foot while the carrier foot is latched to the anchor mechanism. This makes it possible for the carrier foot to be utilized on variously pitched vehicular support surfaces, usually automobile roofs having different shapes at their edge regions.

The latching mechanism has an operating mechanism for configuring the latching mechanism between the latched and the unlatching configurations. As shown, the operating mechanism has a pushing shoulder adapted to engage a receiving shoulder of the latch body for transferring or conveying movement of the operating mechanism to the latch body.

In at least one embodiment of the present invention, an exchangeable head assembly is provided that is coupleable; that is, designed to be connected to a top portion of the housing encasement. The exchangeable head assembly is adapted for releasable fixation with a load carrier cross bar. When mounted upon a vehicle, a load carrier cross bar is coupled or connected between two such carrier feet that are each positioned near to opposite end portions of the load carrier cross bar for suspending the cross bar atop the transporting vehicle.

As illustrated, the anchor mechanism additionally includes at least one insert adapted to be securely received in a channel portion of a vehicularly-mounted rooftop track. It is in this way that that particular version of the invention is secured upon a vehicle's roof that is adapted with such tracks.

In another embodiment, the present invention takes the form of an arrangement for securing a load carrier to a transporting vehicle that has an anchor mechanism adapted for securement to a transporting vehicle and for releasable engagement with a carrier foot. The anchor mechanism has a catch member that is configured for engagement with a latching mechanism. A carrier foot has a latching mechanism that is adapted to assume a latched configuration responsively to being positioned upon the catch member. The arrangement is further adapted to permit pivotation of the latching mechanism relative to the catch member when in a latched configuration so that the carrier foot is permitted to be variably positioned with respect to the anchor mechanism after assumption of the latched configuration.

Still another embodiment of the invention takes the form of a method for securing a load carrier to a transporting vehicle. The method includes providing an anchor mechanism that is adapted for being secured to a transporting vehicle and for releasable engagement with a carrier foot. The anchor mechanism has a catch member that is configured for engagement with a latching mechanism. A carrier foot is installed that has a latching mechanism upon the catch member. The latching mechanism is adapted to assume a latched configuration under the exclusive actuation of the catch member in response to the carrier foot being installed upon the anchor mechanism.

The method further includes resiliently biasing the latching mechanism toward a latching configuration before the carrier foot being installed upon the anchor mechanism. The latching mechanism is then reconfigured from the latching configuration to an unlatched configuration and then to the latched configuration based solely on its cooperation with the catch member as the carrier foot is being installed upon the anchor mechanism. After such installation, the carrier foot may be pivoted relative to the anchor mechanism about an axis substantially parallel to a longitudinal axis of the carrier foot after being installed upon the anchor mechanism and while the latching mechanism is in the latched configuration.

The beneficial effects described above apply generally to the exemplary devices and mechanisms disclosed herein of a load carrier foot arrangement. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
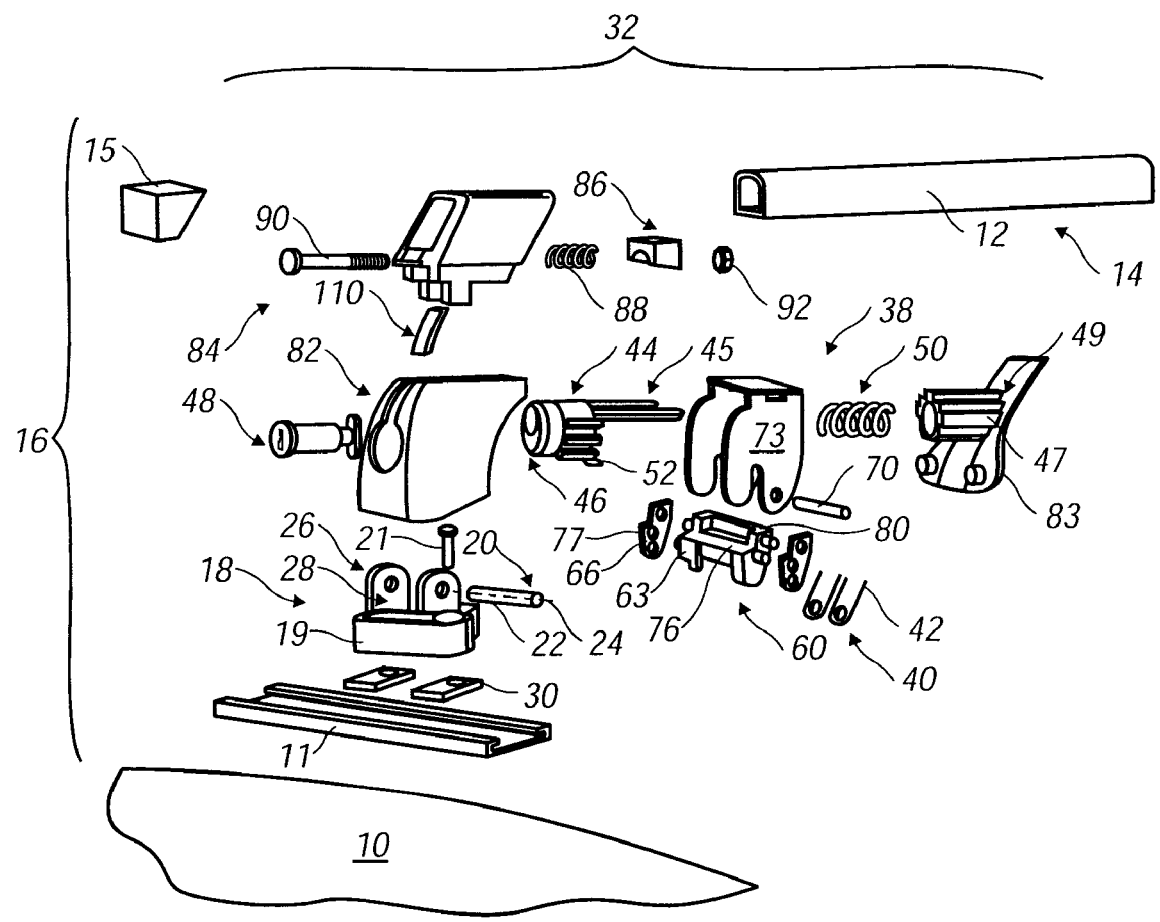
FIG. 1 is an exploded perspective view of a carrier foot arrangement (and shown in context with anchor, bar, channel, and vehicle) constructed according to the present invention.

Referring to the figures and particularly to FIG. 1 at this time, a partial section of the roof region of a transporting vehicle is shown with a track channel 11 installable thereupon. The channel 11 typically has a C-shaped transversely viewed cross-section and may be mounted upon the upper exterior surface of an edge region of a vehicular roof or recessed thereinto. In either case, the track channel 11 is provided to accept insert portions 30 of an anchor mechanism 18 that is designed as a component of an arrangement 16 for securing a load carrier to transporting vehicle 10. The anchor mechanism 18 serves as a support platform for a load carrier foot 32. In this illustrated embodiment, the anchor mechanism 18 includes square inserts 30 that are connected to a base portion 19, one each by a threaded screw 21. In use, the inserts 30 are positioned within the channel 11 with the threaded screw 21 inserted through a lengthwise top opening into the channel 11. The headed portion of the screw 21 is located above the base portion 19 and the threaded portion of the screw 21 extends through the base portion 19 and into a receiving aperture, typically threaded, of the insert 30. The base portion 19 is fixed with respect to the channel 11, and in turn the transporting vehicle 10 by sufficiently tightening the screws 21 so that the insert 30 is drawn up against the underside of the inwardly extending flanges of the channel 11 and so that a lower surface of the base portion 19 is pressed firmly against the topside of the inwardly extending flanges of the channel 11.

The arrangement 16 for securing a load carrier to a transporting vehicle 10 places the carrier foot 32 above the anchor mechanism 18. A top portion 36 of the carrier foot 32 is adapted to accept an exchangeable head assembly 84. The exchangeable head assembly 84 is provided for releasable engagement with a load carrier cross bar 12, typically at an end portion 14 thereof. Each head assembly 84 is adapted to be exchangeable with differently configured head assemblies 84. An array of head assemblies 84 may be differently configured because each is designed for releasably capturing a load carrier cross bar 12 having a different shape and design. Typically, the head assembly 84 will only be exchangeable for the manufacturer of the arrangement 16 and not the purchaser. That is, as far as the end-user or consumer is concerned, the head assembly 84 is a permanent part of the carrier foot 32; and as such, may alternately be commonly encased with the rest of the foot 32. One example of how a head assembly can be made readily interchangeable is by using threaded screws to couple the head assembly 84 to the top 36 of the intermediate portion 37 from within the protected space of the interior region of the carrier foot 32. In this manner, the consumer will not easily access the operational or headed end of the screw. The exchangeable nature of the head assembly 84 is provided so that a manufacturer can easily vary the configurations of the carrier foot 32 to accommodate a wide array of variously styled crossbars 12 that the consuming public may desire to use in combination with the carrier foot 32 of the present invention.

As shown, the head assembly 84 includes a sliding wedge 86 that cooperates with an oppositely configured inclined plane within the head assembly 84. By drawing the sliding wedge 86 up the inclined plane, a tightening engagement between the wedge 86 and a corresponding surface of the load carrier cross bar 12 is affected. In the illustrated embodiment, a threaded bolt's 90 incorporation with a nut 92 is utilized for moving the wedge 86. A spring 88 is shown that acts to bias the wedge 86 down the inclined plane and toward a released configuration in which the cross bar 12 is permitted to slide longitudinally in the head assembly 84. Once the cross bar 12 is properly positioned and fixed to the carrier foot 32, an end cap 15 may be pressingly installed upon the exposed end of the cross bar 12 for closing and providing a finished appearance for the cross bar 12 outside the carrier foot 32.

Referring to FIG. 1, the configuration of the anchor mechanism 18 may be appreciated. Extending upwardly from the base portion 19 is a pair of supports 26 that form flanges to which a catch member 20 is installable and fixable. In the illustrated embodiment, the catch member 20 takes the form of a cylindrical bar 22 having end portions retained within apertures that extend through each of the pair of supports 26. As will be described in detail hereinbelow, a central axis of the bar 22 serves as a pivotation axis 24 about which the carrier foot 32 is pivotable in an installed configuration. In this manner, the bar 22 is suspended above an open space that defines a catch area 28.

The carrier foot 32 includes an intermediate body portion 37 having a housing encasement 82 that covers and protects the internal working mechanisms of the foot 32. One of those working mechanisms is a latching mechanism 38 utilized for releasably securing the carrier foot 32 to the anchor mechanism 18.

Serving as a support for the latching mechanism 38 are two side flanges 73, each having an aperture therethrough for receiving a pivot axle 70 upon which a latch body 60 is journaled for pivotation between a latching configuration and an unlatching configuration. The latch body 60 is designed so that at least a portion thereof is insertible into the catch area 28 underneath the catch member 20.

Figure 2:
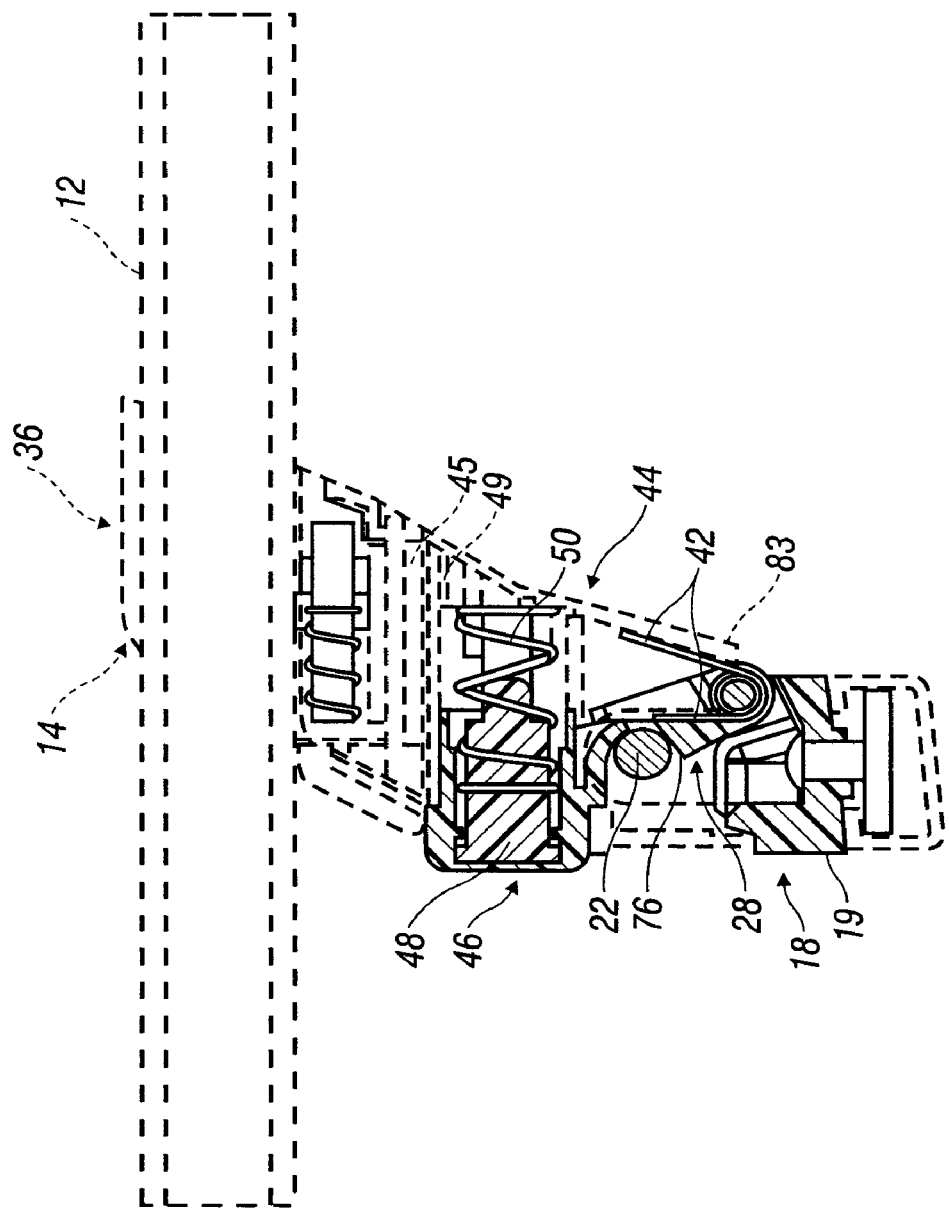
FIG. 2 is a partial cut-away and partial cross-sectional view taken substantially along a bisecting centerline of the carrier foot arrangement of FIG. 1 in a latching configuration.

Referring to FIG. 1, an exploded configuration of the latch body 60 is shown depicting and interior body portion 63 sandwiched between two exterior ears 66. In a preferred embodiment, the interior body portion 63 is constructed from lightweight plastic and the exterior ears 66 are constructed from steel that is more durable. In this manner, most of the forces being conveyed through the latch body 60 are concentrated within the stronger ear portions 66. A resilient biasing mechanism 40 in the form of a spring 42 is utilized to urge the latch body 60 toward the latching configuration. The latching configuration is depicted in FIG. 2 in which an abutment surface 76 of the latch body 60 is under and in abutting engagement with the catch member 20.

The carrier foot 32 and the anchor mechanism 18 are configured so that the foot 32 can be pressed or positioned into latched engagement with the anchor mechanism 18 without further operator manipulation. To enable this feature, the installation process is initiated with the latch body 60 in the orientation depicted in FIG. 2. In this manner, as the carrier foot 32 is moved into position adjacent to the anchor mechanism 18, an inclined surface 77 of the latch body 60 (a surface which is exposed toward the anchor mechanism 18) is generally the first portion of the carrier foot 32 to engage the catch member 20 upon proper approach. After initial engagement and as the carrier foot 32 is moved further down onto the anchor mechanism 18, the bar 22 of the catch member 20 slides up the inclined surface 77 pressing the latch body 60 backward out of the bar's 22 way and in the process compresses the resilient biasing mechanism 40.

As illustrated, the resilient biasing mechanism 40 takes the form of the spring 42. Once the carrier foot 32 is moved sufficiently far down upon the anchor mechanism 18 to be properly seated thereupon, the catch member 20 has slid beyond a top edge of the inclined surface 77 so that the latch body 60 springs outwardly into the catch area 28 under the influence of the spring 42. In this position, the abutment surface 76 is properly position to catch under the catch member 20. Under the bias of the spring 42, the latch body 60 will remain in the latching configuration under the catch bar 22 until purposely moved to an unlatching configuration by the operator.

Figure 3:
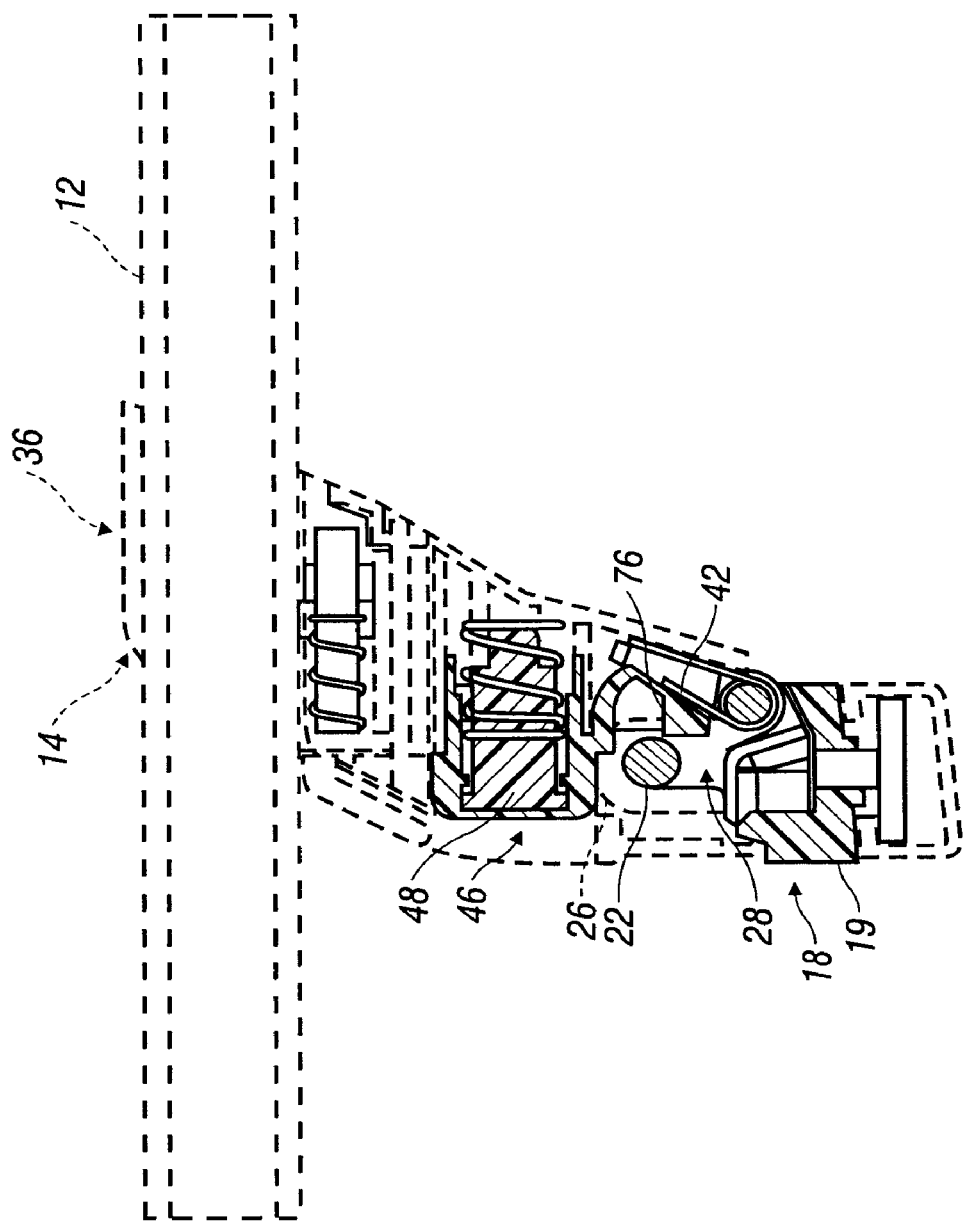
FIG. 3 is a partial cut-away and partial cross-sectional view taken substantially along a bisecting centerline of the carrier foot arrangement of FIG. 1 in an unlatched configuration.

The unlatching configuration of the arrangement 16 is illustrated in FIG. 3. Therein, an operating mechanism 44 is shown depressed into the carrier foot 32. The purpose of the operator depressing the operating mechanism 44 is to cause the pushing shoulder 52 of the operating mechanism 44 to also travel inwardly and engage the receiving shoulder 80 of the latch body 60. Continued inward travel of the pushing shoulder 52 causes the latch body 60 to be pivoted back out of the catch area 28 so that the abutment surface 76 is no longer trapped under the catch member 20. This effectively disengages the carrier foot 32 from the anchor mechanism 18. The carrier foot 32, and any load carrier or load carrier cross bar 12 connected to the foot 32 can now be lifted away from the transporting vehicle 10. The operating mechanism 44 is manipulated by an operator through the use of the push-button actuator 46 which is at least partially exposed through the housing encasement 82. The actuator 46 includes guide prongs 45 as illustrated. An interior travel guide 47 is provided that is fixed upon a housing closure member 83 that matingly engages with the housing encasement 82 to form a substantially complete enclosure for the intermediate body portion 37 of the carrier foot 32. The interior travel guide 47 has an exterior surface complimentarily configured to facilitate gliding operation of the push button actuator 46 thereupon. Still further, the interior travel guide 47 has receivers specifically arranged to form prong tracks 49 within which the guide prongs 45 slide and which also assist in guiding travel of the push button actuator 46 and its associated components, including the pushing shoulder 52.

A resilient biasing mechanism 50 in the form of a coil spring is provided to urge the push button actuator 46 toward an un-actuated configuration as is shown in FIG. 2. In this manner, the pushing shoulder 52 will normally be moved away from the latch body 60 unless purposefully depressed by and operator to cause the assumption of the unlatching configuration of the carrier foot 32.

Figure 4:
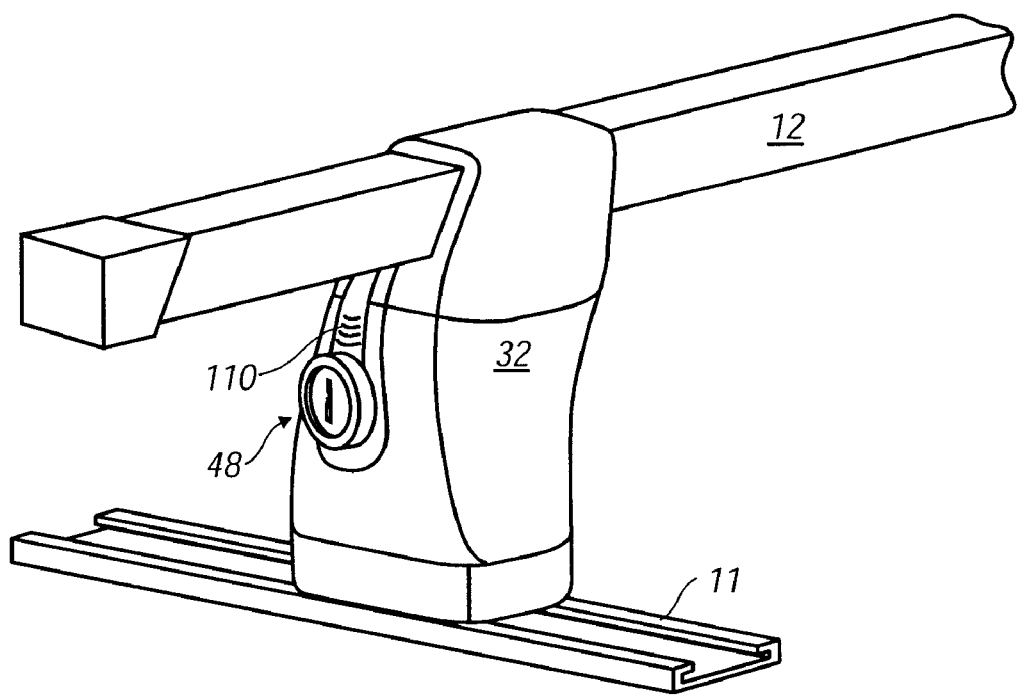
FIG. 4 is an assembled perspective view of a carrier foot arrangement in accordance with preferred embodiments of the present invention.
Figure 14A:
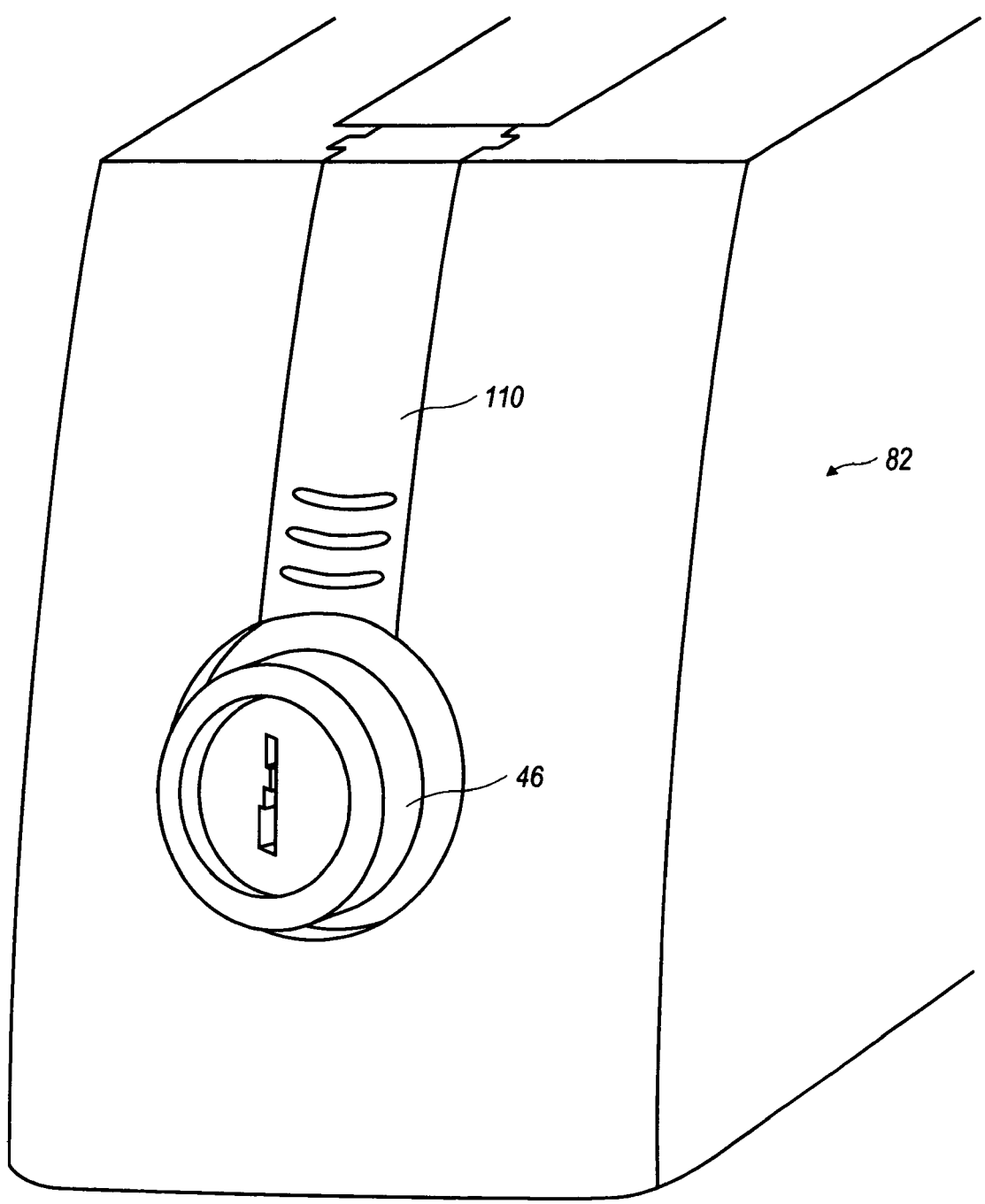
Figure 14B:
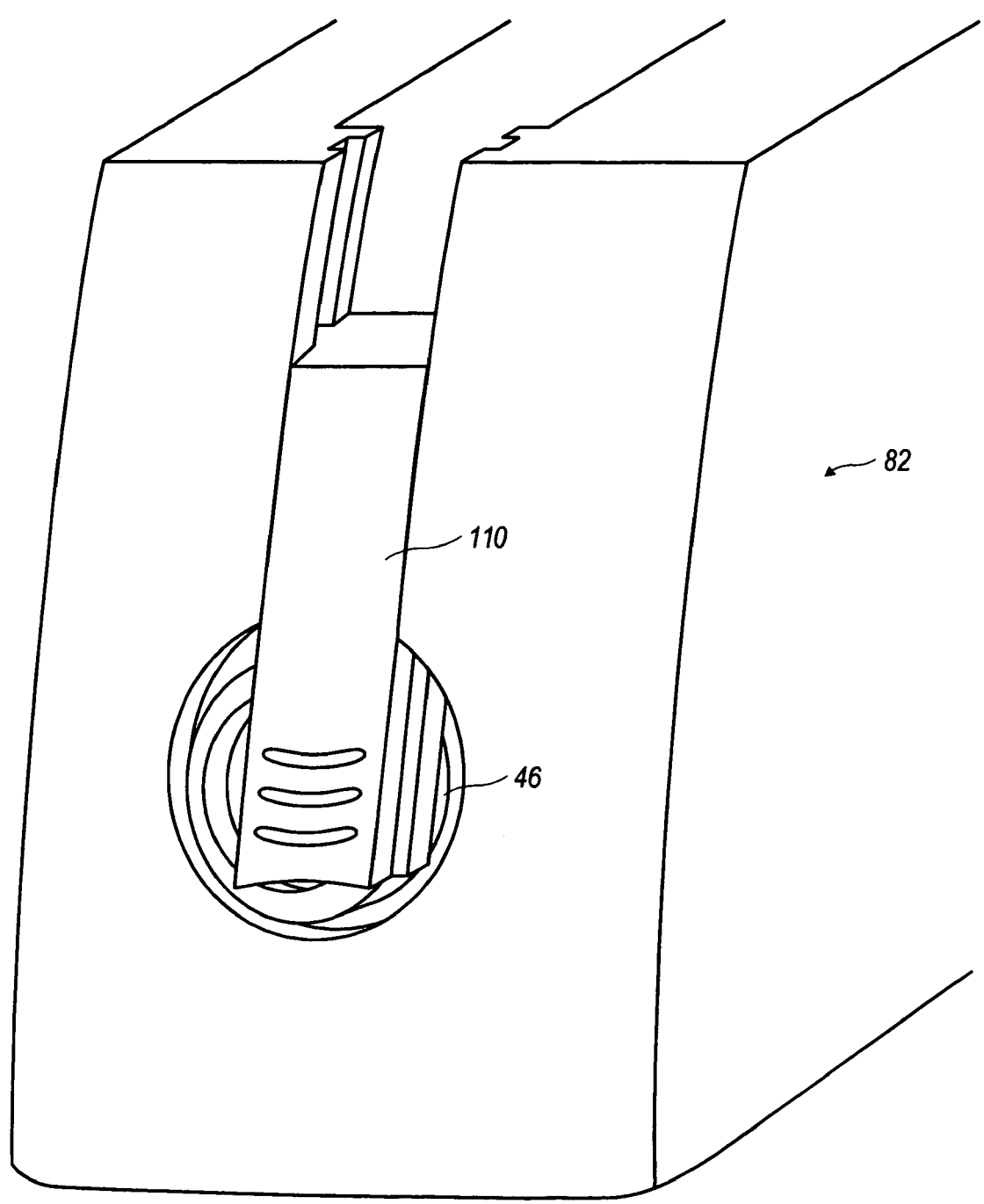

A lock mechanism 48 is provided for cooperation with the push button actuator 46 of the operating mechanism 44. In the illustrated embodiment, the lock mechanism 48 is of a conventional design having a head portion with a protrusion that can be rotated into and out of locking engagement with a receiving recess using a conventional key. When in the locked configuration, the protrusion of the lock mechanism 48 prevents sliding operation of the push button actuator 46 upon the travel guide 47 because the protrusion is caught within the recess in the body 37 of the carrier foot 32. In this manner, unauthorized disengagement of the carrier foot 32 from the anchor mechanism 18 is prevented. Because the latch body 60 is spring biased toward the latching configuration, the operating mechanism 44 can be locked prior to the foot 32 being positioned upon the anchor mechanism 18 and further manipulation by the operator is not required for affecting locked and latched connection of the foot 32 thereupon. A sliding cover 110 is shown in FIGS. 1, 4, 14*a* and 14*b*. As depicted in FIGS. 4, 14*a* and 14*b*, the cover 110 is provided at an exterior surface thereof with frictional ridges intended to be engaged by a person's thumb or finger. When in the position shown in FIGS. 4 and 14*a* the cover 110 completes the enclosure of the housing about the carrier foot 32. During installation and removal of the foot 32 to a carrying vehicle, however, as shown in FIG. 14*b*, the cover 110 can be moved into a downward position when the push a button actuator 46 of the lock mechanism 48 is depressed. In so doing, the actuator 46 will be maintained in a released configuration. This greatly assists a user by making it possible to maintain two feet at opposite ends of a cross bar 12 in released configurations until purposefully engaged to the anchor 18. This is particularly important when it is considered that each of the two feet of the pair are typically configured for engagement to and removal from the anchors 18 at opposite sides of the vehicle. Preferably, the feet are concurrently moved to the releasing configuration at least for removal. This dual released configuration may also be desired during installation when proper positioning is initially required, and then the two separate feet are moved into the engaged configuration.

The sliding operation of the cover 110 may be accomplished by any suitable configuration, but as shown in FIGS. 14*a* and 14*b*, a tongue-in-groove arrangement is preferably utilized. Still further, by having the tongue frictionally fit within the groove, upward and downward positions of the cover 110 may be maintained until purposely moved by the user.

Figure 5:
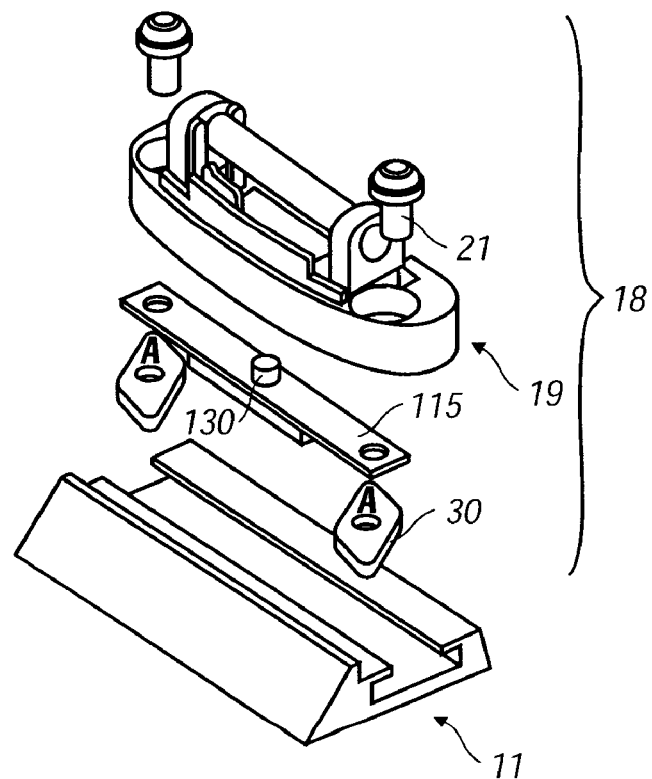
FIG. 5 is an exploded view demonstrating a spacer configured to be positioned between a base unit and a track channel in accordance with preferred embodiments of the present invention.

FIG. 5 discloses an exploded view of an anchor mechanism 18 with a spacer 115 positioned between the base 19 and a track channel 11. Because of the reduced-width slot through which the inserts 30 must pass into the interior space of the track channel 11, each insert 30 is configured in the shape of a parallelogram as illustrated. The inserts 30 are configured to accommodate their insertion through the top of the channel 19 because the end portions of the track are difficult to remove for providing access. When tightening the base 19 to the track 11, the threaded screws or bolts 21 are rotated thereby pulling the insert 30 toward the base 19. Before a tightened orientation is achieved, it is possible for there to be play between the base 19 and the top of the track 11. In this condition, it is possible for either or both of the inserts 30, or a portion thereof, to protrude back out of a slot of the track 11 thereby fouling its engagement therein.

Figure 6:
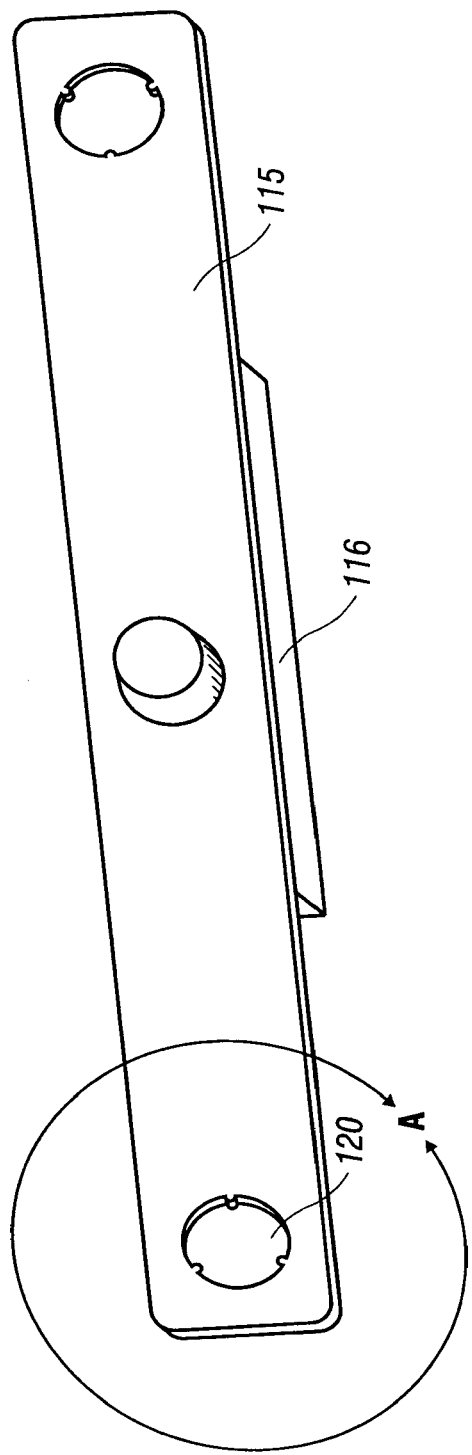
FIG. 6 is a perspective view of a spacer in accordance with preferred embodiments of the present invention.
Figure 7:
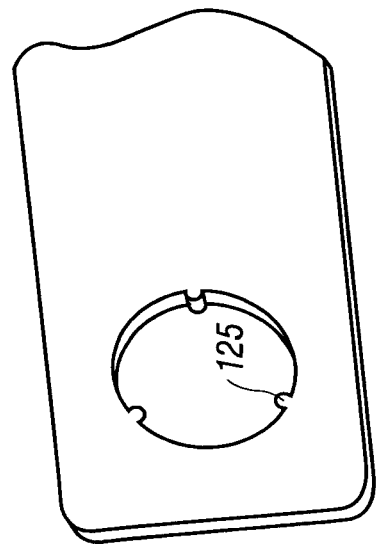
FIG. 7 is a perspective view of a bolt aperture in the spacer of FIG. 6.

This condition in which an end portion of the insert 30 can protruded out of the slot of the track 11 is more likely to occur when the base 19 is not centered above the slot of the track 11. Therefore, the spacer 115 has been provided to establish a proper orientation and to prevent the unintended protrusion and misinstallation of the insert 30 into the channel of the track 11. The insert 115 has a pin-portion 130 at its upper surface intended to be inserted into a receiver at the bottom of the base 19. An expanded portion 116 at the bottom side of the spacer 115 is configured for insertion into the slot of 10 the track 11. As shown in FIG. 6 and FIG. 7, bolt apertures 120 are provided at each end of the spacer 115 for accepting the threaded bolts 21 therein. Threaded inserts or protrusions 125 are provided at an interior periphery of the apertures 120 for engaging the threads of the bolts 21. In this manner, the bolts 21 are prevented from unintentionally disengaging from those apertures 120 in the event that the spacer 115 is turned upside down during the installation process. Still further, these protrusions 125 keep the easily separable bolts 21 and spacer 115 together so that they are less likely to be lost one from the other.

Figure 8:
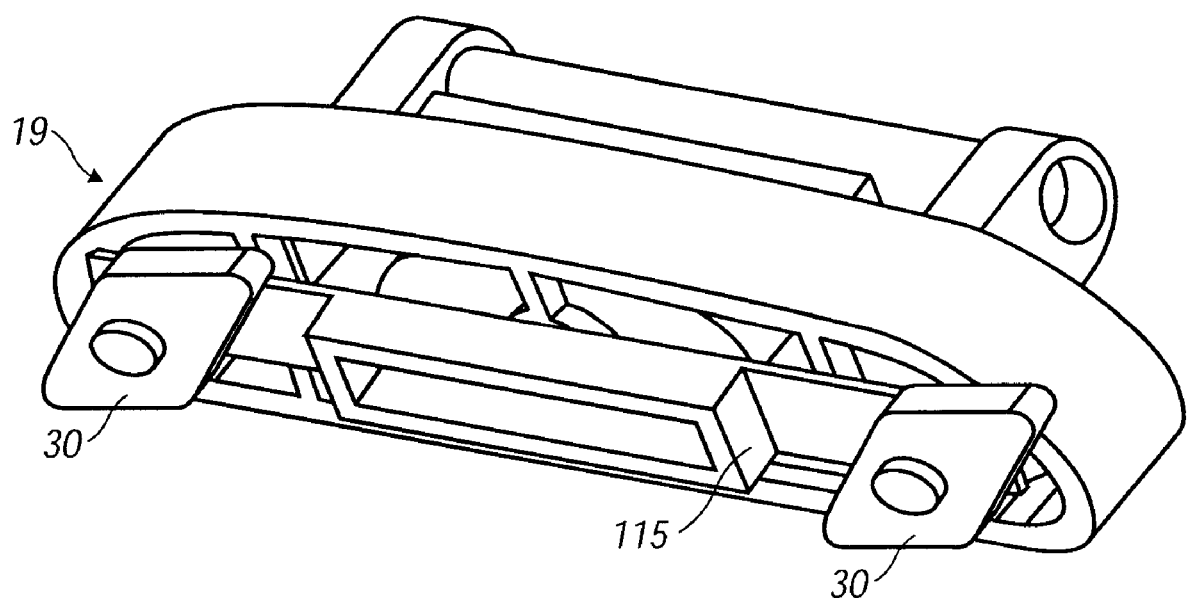
FIG. 8 is a bottom perspective view of a spacer connected to a base unit in accordance with preferred embodiments of the present invention.
Figure 9:
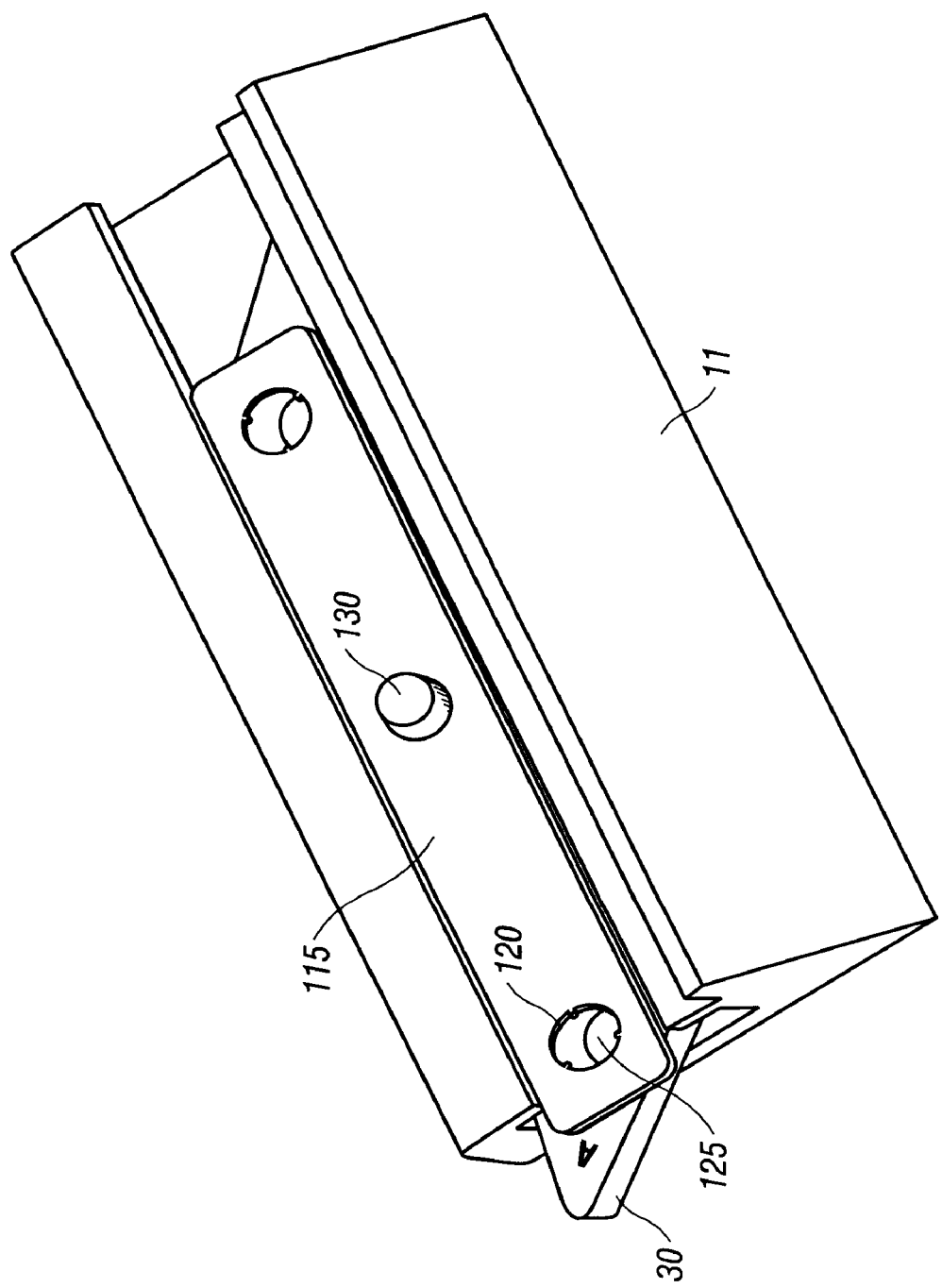
FIG. 9 is a top perspective view of a spacer positioned in a track slot.
Figure 10:
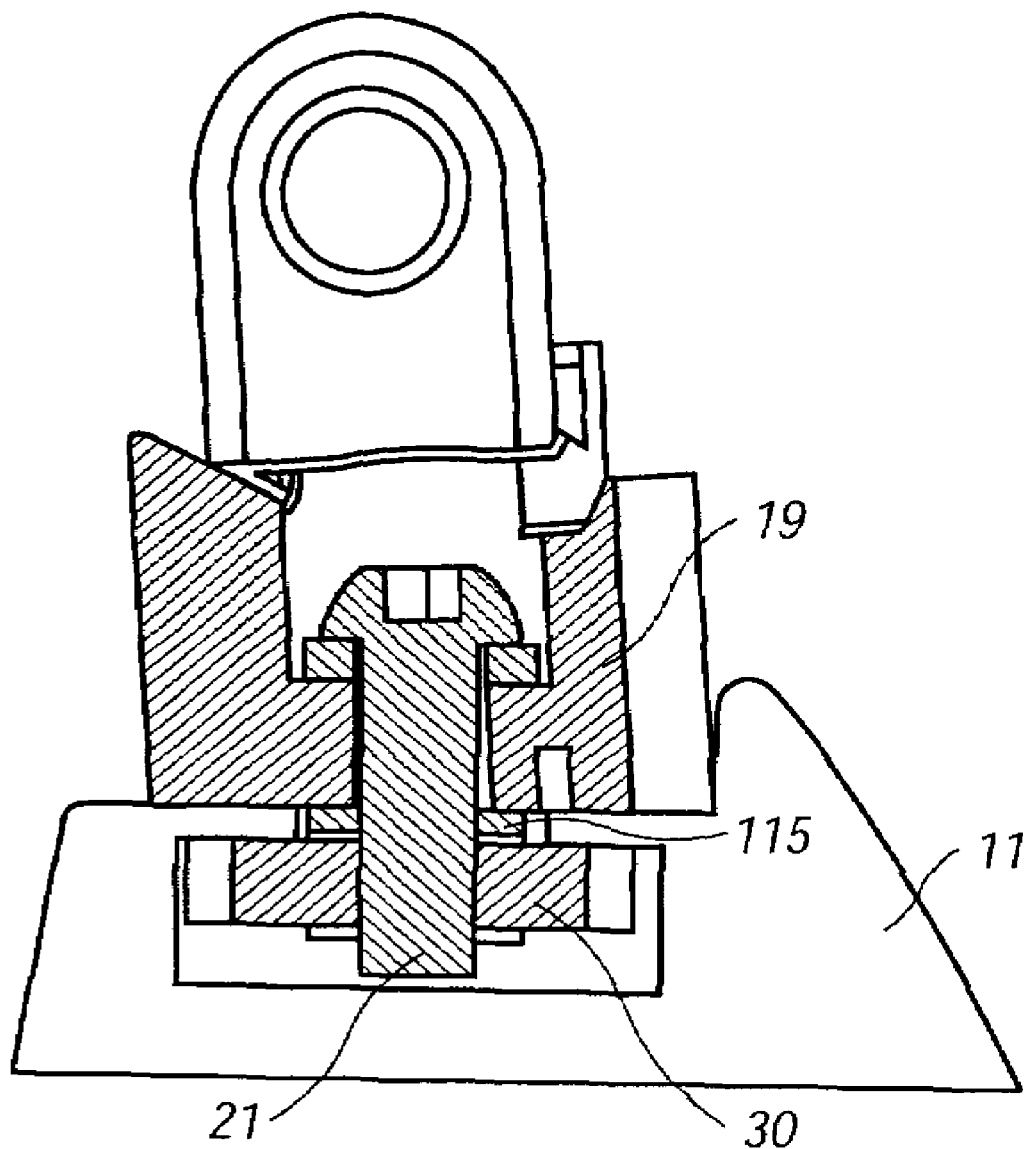
FIG. 10 is a cross-sectional view of a base attached to a track slot, including a spacer in accordance with preferred embodiments of the present invention.

FIG. 8 provides a perspective bottom view of an assembled anchor mechanism 18 and spacer 115. FIG. 9 provides a top perspective view of a spacer 115 located in the track 11 with the inserts 30 shown in their properly installed orientation. FIG. 10 shows a cross-sectional view of an assembled arrangement of a base 19 with a spacer 115 properly installed in a track 11.

Figure 12:
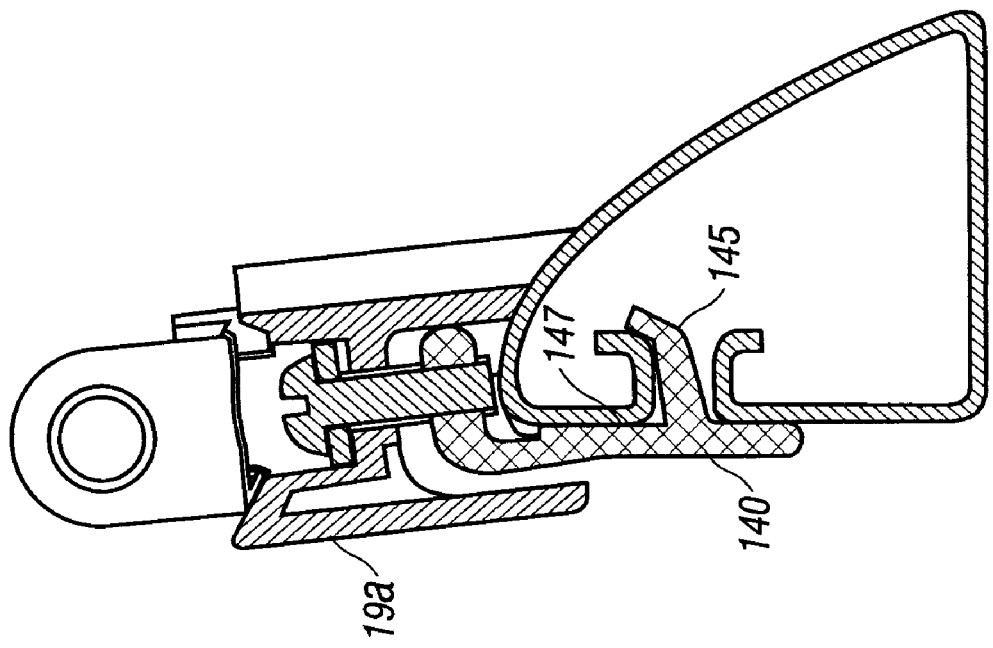
FIG. 12 is a cross-sectional view of an accommodation unit installed interstitially between a specially configured base unit and a side-access channel in accordance with preferred embodiments of the present invention.
Figure 11:
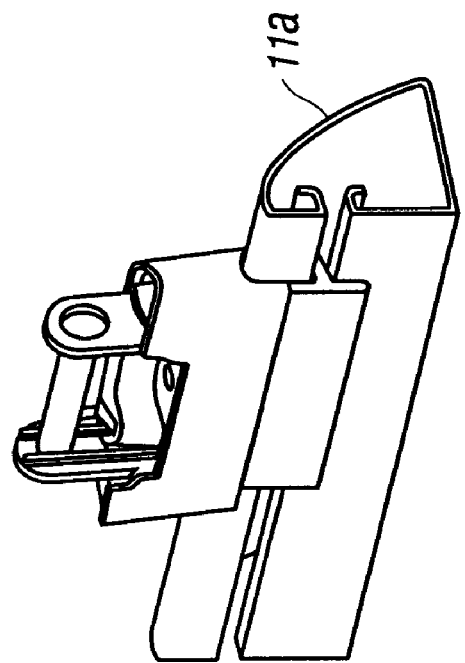
FIG. 11 is a perspective view of an accommodation unit interconnecting an anchor and a channel in accordance with preferred embodiments of the present invention.

FIG. 11 shows an alternative track configuration 11a in which the access slot is provided in a sidewall thereof. As shown, this slot is typically too close to the top surface of the carrying vehicle 10 for adequate utilization. Still further, a problem occurs when clamping to such a track because the slot is perpendicular to the roof surface of the vehicle. As a result, unless otherwise configured the base would rotate out of the slot. To counter this motion, a stop 147 has been incorporated into a mounting bracket. The mounting bracket is characterized as an accommodation unit 140. FIG. 12 shows a cross-sectional view in which the accommodation unit 140 is provided for connecting an alternatively configured base 19a to the track 11a. In the illustrated embodiment, the accommodation unit 140 includes an insert tab 145 that runs longitudinally along the length of the accommodation unit 140 and is configured to be inserted into the sidewall access slot of the track 11a. The tab 145 is turned up at its distal end for engagement with interior lips of the slot. In other respects, the accommodation unit 140 is configured to properly position the base 19a with respect to the track 11a for operation and utilization.

Figure 13:
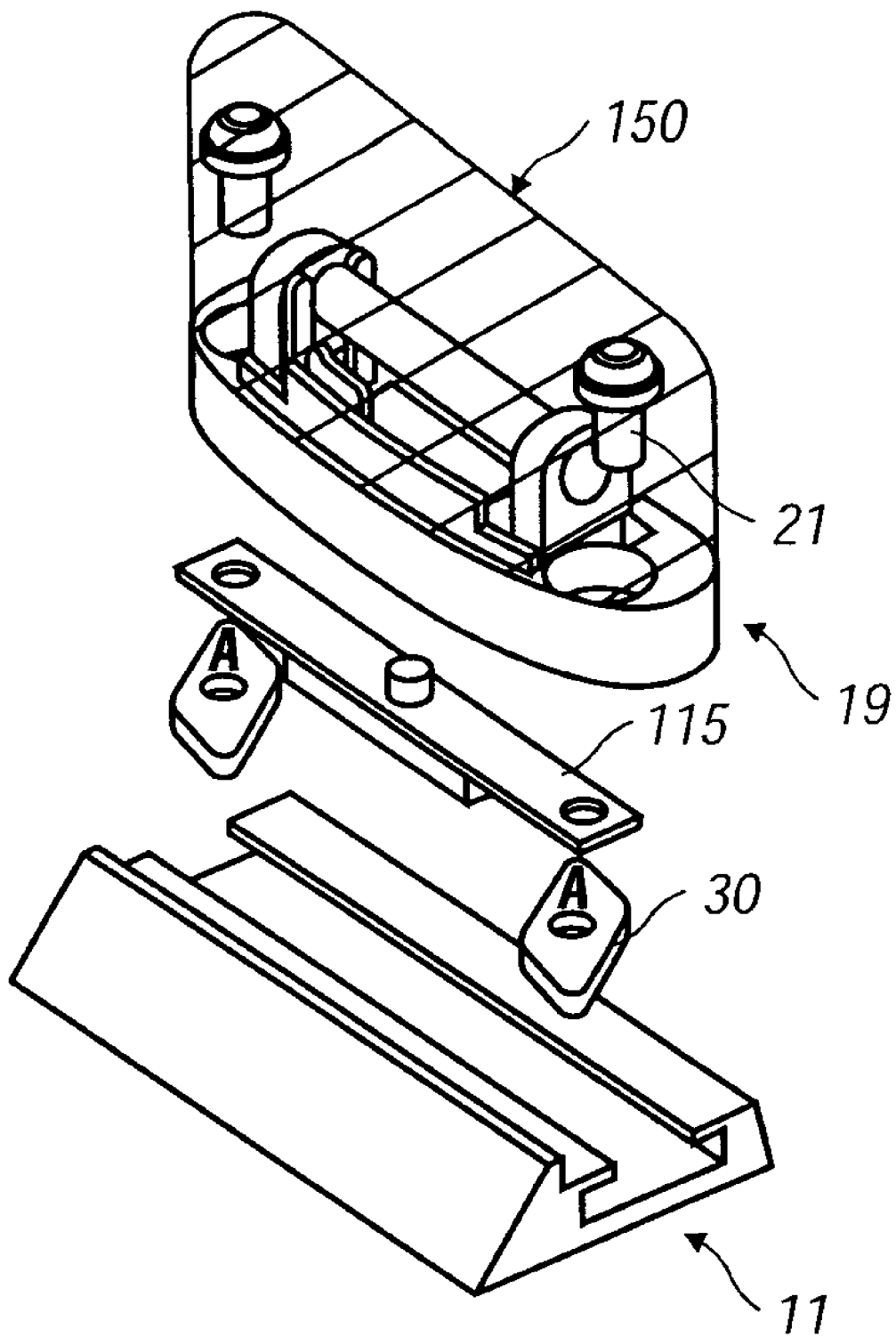
FIG. 13 is an exploded perspective view illustrating a base cover installed over a base unit in a spacer-incorporating configuration in accordance with preferred embodiments of the present invention; and, FIGS. 14a and 14b are partial Perspective views of a housing encasement, push-button actuator and sliding cover according to an embodiment of the present invention wherein the push-button actuator and sliding cover maintain non-actuated and actuated configurations, respectively.

FIG. 13 provides a perspective view in which a base cover 150 is shown that can be readily installed upon the base 19. It is a characteristic of the present invention that the base portion 19 may remain attached to the carrying vehicle 10 even when the rack system is detached therefrom. The interior workings of the base portion 19, however, remain exposed when a carrier foot 32 is not installed there upon. Therefore, it is desirable to have a cover such as that shown as the base cover 150 that not only serves an aesthetic purpose, but also protects the mechanisms of the base 19 from dirt and possible damage if struck by an object. Still further, the base cover 150 can provide protection for persons in its vicinity or who may be struck by the base 19 because of the smooth exterior surface of the cover 150 that is less likely to gouge into a person or object upon contact. The connection assembly between the cover 150 and the base 19 can be similarly configured to the connective mechanisms disclosed for the carrier foot 32, or any other suitable releasable connective arrangement adequate to serve this purpose.

An arrangement 16 for securing a load carrier to a transporting vehicle 10 has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the vehicular load carrier industries.

The invention claimed is:

1. An arrangement for securing a load carrier to a transporting vehicle, the arrangement comprising:
    an anchor mechanism adapted for securement to the transporting vehicle and for releasably receiving a carrier foot, the carrier foot including a push-button actuator for configuring the carrier foot between secured and unsecured configurations;
    a housing encasing the carrier foot, wherein the push-button actuator extends through and is at least partially exposed by an opening in the housing thus permitting operator manipulation of the push button actuator; and
    a sliding cover having a substantially planar surface adapted for digital engagement by a user and said sliding cover being user-transitionable between a closed position in which the push-button is blocked from passing through the opening and an open position in which the push-button is permitted to pass through the opening.

2. The arrangement as recited in claim 1, wherein the sliding cover further includes a plurality of frictional ridges upon an outer surface of the sliding cover for facilitating changes in the position of the sliding cover.

3. The arrangement as recited in claim 1, wherein the sliding cover is positionable such that the sliding cover will maintain the push-button actuator in a depressed position.

4. The arrangement as recited in claim 1, wherein the sliding cover engages the housing through a tongue-and-groove interface.

5. The arrangement as recited in claim 1, further comprising an insert for use in combination with said anchor mechanism for securing the load carrier to the transporting vehicle and wherein the transporting vehicle has a channel that is generally "C" shaped in cross section and has a top opening, the insert being a quadrilaterally shaped plate in which a first pair of parallel sides are longer than a second pair of parallel side such that the insert can be positioned inside the channel with the first pair of parallel sides aligned with the top opening and subsequently the insert can be repositioned within said channel so that the first pair of parallel sides and the insert are substantially across the width of the top opening.

6. The arrangement as recited in claim 5, wherein the insert has a parallelogram shape.

7. The arrangement as recited in claim 5, wherein the insert has an oblique parallelogram shape.

8. The arrangement as recited in claim 5, wherein the insert further comprises at least one insert aperture defined therethrough.

9. The arrangement as recited in claim 8, wherein the insert aperture is threaded so that the insert aperture can receive a corresponding threaded fastener.

10. The arrangement as recited in claim 1, further comprising a spacer for use in combination with said anchor mechanism and an insert for securing the load carrier to the transporting vehicle, the transporting vehicle having a channel that is generally "C" shaped in cross section and having a top opening, said spacer configured to be positioned substantially within and substantially across the width of the top opening of the channel, and wherein the spacer has defined therethrough at least one spacer aperture.

11. The arrangement as recited in claim 1, further comprising a spacer for use in combination with said anchor mechanism and an insert for securing the load carrier to the transporting vehicle, the transporting vehicle having a channel that is generally "C" shaped in cross section having slot and a top opening, said spacer comprising a spacer plate having a width that allows the positioning the spacer substantially within and substantially across the width of the top opening of the channel, and at least one spacer aperture defined therethrough for accepting a fastener.

12. The arrangement as recited in claim 11, wherein the spacer plate has an upper surface and the spacer further comprises a first expanded portion on the lower surface of the spacer plate, the first expanded portion being configured for insertion into the slot of the channel.

13. The arrangement as recited in claim 11, wherein the spacer plate has a lower surface and the spacer further comprises a pin-portion on the upper surface of the spacer plate, the pin-portion being designed to be received into a recess at the bottom of a base.

14. The arrangement as recited in claim 11, wherein the spacer aperture is threaded for engaging a corresponding portion of a threaded fastener.

15. The arrangement as recited in claim 11, wherein the spacer aperture includes a protrusion provided at an interior periphery of the aperture for engaging a portion of a threaded fastener.

16. The arrangement as recited in claim 11, wherein the spacer plate has an upper and lower surface and the spacer further comprises a first expanded portion on the lower surface of the spacer plate, the first expanded portion being configured for insertion into the slot of the channel and a second expanded portion on the upper surface of the spacer plate, the second expanded portion being designed to be received into a recess at the bottom of a base.

17. The arrangement as recited in claim 1, wherein the anchor mechanism for securing the load carrier to the transporting vehicle includes a channel, the channel having a generally C-shaped cross section and the anchor comprising: a base having defined therethrough at least one base aperture, wherein the base is adapted to be positionable outside and substantially across the width of the top opening of the channel; at least one insert, wherein each insert is adapted to be positionable inside and substantially across the width of the top opening of the channel at a location substantially under the base, and having defined therethrough at least one insert aperture; at least one spacer, wherein each spacer is adapted to be positionable substantially within and substantially across the width of the top opening of the channel, and substantially between the base and the insert; and wherein the spacer has defined therethrough at least one spacer aperture; and at least one fastener, each fastener adapted for insertion through the base aperture, through the spacer aperture, and through the insert aperture thus securing the anchor to the vehicle and concurrently drawing the insert snugly against the interior side of the top of the channel and drawing the base snugly against the exterior side of the top of the channel.

18. The arrangement as recited in claim 17, wherein at least a portion of the fastener is threaded, and wherein the insert aperture is correspondingly threaded.

19. The arrangement as recited in claim 17, wherein the spacer further includes an expanded portion adapted to extend into the interior space of the channel.

20. The arrangement as recited in claim 17, wherein the spacer further includes a pin portion on an upper surface of the spacer, and wherein the base further includes a pin-receiver portion at a lower surface of the base, wherein the pin portion is adapted to be insertable into the pin-receiver portion for promoting the alignment of the elements of the anchor.

21. The arrangement as recited in claim 17, wherein at least a portion of the fastener is threaded, and wherein the spacer aperture, through which the fastener is inserted, includes means for engaging the threads of the threaded fastener.

22. The arrangement as recited in claim 21, wherein the means for engaging the threads of the threaded fastener include threaded inserts.

23. The arrangement as recited in claim 21, wherein the means for engaging the threads of the threaded fastener include protrusions.

24. The arrangement as recited in claim 21, wherein at least a portion of the fastener is threaded, and wherein the spacer aperture is correspondingly threaded to accept at least a portion of the threaded fastener.

25. The arrangement as recited in claim 1, wherein the transporting vehicle includes a channel, the channel having a generally C-shaped cross section with an access slot provided in a sidewall of the channel and said arrangement further comprising a base and an accommodation unit and said accommodation unit being adapted for releaseable securement to the base, and having an insert tab, said insert tab extending longitudinally along the length of the accommodation unit, and adapted for insertion into the access slot, and having a distal end turned up for engagement with an interior lip of the access slot.

26. The arrangement as recited in claim 1, wherein said anchor mechanism comprises an accommodation unit for use in combination with a base for securing the load carrier to the transporting vehicle, the transporting vehicle having a channel that is generally C-shaped in cross section and having an access slot provided in a sidewall of the channel, said accommodation unit comprising: a stop including means for releasably securing the accommodation unit to the base; and an insert tab extending longitudinally along the length of the accommodation unit, wherein the insert tab is adapted for insertion into the access slot, and wherein the insert tab has a distal end turned up for engagement with an interior lip of the access slot.

27. The arrangement as recited in claim 1, wherein said anchor mechanism comprises an accommodation unit for use in combination with a base for securing the load carrier to the transporting vehicle, the transporting vehicle having a channel that is generally "C" shaped in cross section and having an access slot provided in a sidewall of the channel, said accommodation unit comprising: a substantially vertical stop plate having an upper edge in proximity to the base and a side wall in proximity to the access slot; a fastener tab extending laterally from the upper edge of the stop plate, wherein the fastener tab has defined therethrough at least one stop plate aperture; and an insert tab extending laterally from the side wall of stop plate, wherein the insert tab is adapted for insertion into the access slot, and wherein the insert tab has a distal end turned up for engagement with an interior lip of the access slot.

28. The arrangement as recited in claim 27, wherein the stop plate aperture is threaded for engaging a corresponding portion of a threaded fastener.

29. The arrangement as recited in claim 1, further comprising a cover positionable upon the anchor mechanism when no carrier foot is received thereupon, the cover configured to provide a protective sheath over internal working mechanisms embodied substantially within the anchor mechanism during times of non-use.

* * * * *